United States Patent
Kuehner et al.

(10) Patent No.: US 10,676,139 B2
(45) Date of Patent: Jun. 9, 2020

(54) LINKING STRUCTURE FOR LINKING A FIBER-REINFORCED PLASTICS COMPONENT TO A LINKING COMPONENT, AND AN ASSEMBLY OF A FIBER-REINFORCED PLASTICS COMPONENT ON AT LEAST ONE LINKING COMPONENT

(71) Applicant: Dr. Ing. h.c. F. Porsche Aktiengesellschaft, Stuttgart (DE)

(72) Inventors: Patrick Kuehner, Stuttgart (DE); Markus Flaig, Althengstett (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 13 days.

(21) Appl. No.: 15/913,067

(22) Filed: Mar. 6, 2018

(65) Prior Publication Data

US 2018/0281872 A1    Oct. 4, 2018

(30) Foreign Application Priority Data

Mar. 30, 2017    (DE) .......................... 10 2017 106 878

(51) Int. Cl.
| | | |
|---|---|---|
| *B62D 25/08* | (2006.01) | |
| *B62D 27/06* | (2006.01) | |
| *B62D 29/04* | (2006.01) | |
| *B62D 29/00* | (2006.01) | |

(52) U.S. Cl.
CPC ......... *B62D 27/065* (2013.01); *B62D 29/001* (2013.01); *B62D 25/082* (2013.01); *B62D 25/088* (2013.01)

(58) Field of Classification Search
CPC .. B62D 25/082; B62D 25/088; B62D 29/001; B62D 27/065; B62D 29/04; B62D 29/048
USPC ..... 296/187.09, 193.02, 193.09, 203.02, 198
See application file for complete search history.

(56) References Cited

U.S. PATENT DOCUMENTS

| | | | |
|---|---|---|---|
| 4,693,140 A | 9/1987 | Stephan | |
| 5,738,476 A | 4/1998 | Assimakopoulos | |
| 8,808,488 B2 | 8/2014 | Nogues et al. | |
| 2004/0045762 A1* | 3/2004 | Budde ................... | B60G 7/001 180/312 |

(Continued)

FOREIGN PATENT DOCUMENTS

| | | |
|---|---|---|
| DE | 10 2010 032 885 | 2/2012 |
| DE | 10 2011 107 237 | 5/2012 |

(Continued)

OTHER PUBLICATIONS

Computer translation of DE 102013015184 (Year: 2013).*

(Continued)

*Primary Examiner* — Gregory A Blankenship
(74) *Attorney, Agent, or Firm* — Gerald E. Hespos; Michael J. Porco; Matthew T. Hespos

(57) ABSTRACT

A linking structure (1) is provided for linking a fiber-reinforced plastic component (2) to a support. The linking structure (1) has a main body (3) produced from a fiber-composite material and has a linking portion (4) configured so that a fastening screw can pass through the linking portion (4). The fastening screw is screw-fittable to the support. The linking portion (4) has two opposite end sides, and a fiber-reinforced cross-laid structure (7) extends between the two end sides of the linking portion (4).

6 Claims, 2 Drawing Sheets

(56) References Cited

U.S. PATENT DOCUMENTS

| | | | | |
|---|---|---|---|---|
| 2008/0169683 | A1* | 7/2008 | Hedderly | B62D 25/16 296/193.09 |
| 2010/0196637 | A1 | 8/2010 | Lippert | |
| 2010/0320712 | A1* | 12/2010 | Leanza | B62D 25/082 280/124.134 |
| 2011/0254316 | A1* | 10/2011 | Watanabe | B62D 25/147 296/193.02 |
| 2013/0020019 | A1 | 1/2013 | Nogues et al. | |
| 2013/0334841 | A1* | 12/2013 | Heise | B62D 25/00 296/203.01 |
| 2014/0137700 | A1 | 5/2014 | Fiedler | |
| 2015/0069779 | A1 | 3/2015 | Morris et al. | |
| 2015/0076867 | A1* | 3/2015 | Bechtler | B62D 25/088 296/203.02 |
| 2017/0080985 | A1* | 3/2017 | Wilhelm | B62D 27/065 |
| 2017/0313360 | A1* | 11/2017 | An | B62D 25/082 |

FOREIGN PATENT DOCUMENTS

| | | |
|---|---|---|
| DE | 10 2010 053 850 | 6/2012 |
| DE | 20 2012 006 236 | 9/2012 |
| DE | 10 2013 005 570 | 3/2014 |
| DE | 10 2013 015 184 | 10/2014 |
| DE | 10 2013 206 237 | 10/2014 |
| DE | 10 2013 208 278 | 11/2014 |
| DE | 10 2014 112 196 | 3/2015 |
| DE | 10 2014 115 491 | 4/2016 |
| EP | 2 055 533 | 5/2009 |
| GB | 2129365 A | 5/1984 |
| WO | 2010028720 A2 | 3/2010 |
| WO | 2011117546 A1 | 9/2011 |

OTHER PUBLICATIONS

Computer translation of DE 102013005570 (Year: 2013).*
United Kingdom Examination Report and Search Report dated Aug. 21, 2018.
German Search Report dated Sep. 7, 2017.
Korean Office Action dated Sep. 10, 2019.
Indian Examination Report dated Mar. 3, 2020.
French Search Report dated Mar. 19, 2020.

* cited by examiner

LINKING STRUCTURE FOR LINKING A FIBER-REINFORCED PLASTICS COMPONENT TO A LINKING COMPONENT, AND AN ASSEMBLY OF A FIBER-REINFORCED PLASTICS COMPONENT ON AT LEAST ONE LINKING COMPONENT

CROSS REFERENCE TO RELATED APPLICATION

This application claims priority under 35 USC 119 to German Patent Appl. No. 10 2017 106 878.3 filed on Mar. 30, 2017, the entire disclosure of which is incorporated herein by reference.

BACKGROUND

Field of the Invention

The invention relates to a linking structure for linking a fiber-reinforced plastics component to a support.

Related Art

Constructive measures for reducing the overall mass of the motor vehicle play an important part in the development of motor vehicles. One such constructive measure has been to produce parts of a vehicle body from a fiber-composite material. For example, DE 10 2010 053 850 A1 discloses a stiffening strut with a linking structure produced from a fiber-composite material. A reinforcement is provided for an entire linking portion or at least a joint. The reinforcement can be an embedded metal core, a metal insert, or a metal cladding.

It has been demonstrated that one or more metal inserts in a fiber-composite linking structure cannot provide a sufficiently high compressive strength and compressive rigidity in a screw fitting of the fiber-composite linking structure to a linking component that also is made of a fiber-reinforced plastic.

The invention is based on the object of providing a linking structure for linking a fiber-reinforced plastics component to a support, and providing a generic assembly by means of which the compressive strength and the compressive rigidity can be increased in the region of the screw fitting.

SUMMARY

A linking structure according to the invention is distinguished in that a fiber-reinforced cross-laid structure is configured between the two ends of a linking portion. The fiber-reinforced cross-laid structure is integral to the main body, is integrated into the linking structure and is provided between the two end sides. Thus, the screw-connection region of the linking structure can advantageously be exposed to higher compressive stresses. The fiber-reinforced cross-laid structure does not increase the overall mass of the linking structure significantly, if at all.

A metal insert may be disposed on each of the two opposite end sides of the linking portion. These metal inserts that are provided on the end sides and like the fiber-reinforced cross-laid structure are configured so as to be integral to the main body. The metal inserts are employed by virtue of the maximum permissible contact pressure per unit area in order for markings on account of the screw fitting advantageously not to be visible at the end side in the fiber-reinforced plastics component.

The fiber-reinforced cross-laid structure may have a cross-sectional shape that corresponds to a cross-sectional shape of the linking portion. The fiber-reinforced cross-laid structure and the linking portion can have a substantially U-shaped cross section. Other cross-sectional shapes of fiber-reinforced the cross-laid structure and of the support, which do not correspond to one another or do so only to a limited extent, are possible in principle.

The metal inserts may have a cross-sectional shape that corresponds to a cross-sectional shape of the linking portion. For example, the metal inserts and the linking portion can have a substantially U-shaped cross section. However, other cross-sectional shapes of the two metal inserts and of the linking portion are likewise possible in principle.

The cross-laid structure may have a unidirectional fiber-reinforcement to increase the compressive strength and the compressive rigidity of the screw fitting.

The unidirectional fiber-reinforced cross-laid structure can have a fiber direction that extends in the axial direction of the linking portion. The fiber direction thus corresponds advantageously with the screw-fitting direction of the fastening screw, which when assembling is passed through the linking portion. This likewise has a positive effect on the compressive strength and the compressive rigidity of the screw fitting.

A main body of the linking structure may be produced from a C-sheet molding compound (abbreviated: C-SMC). The C-sheet molding compound is a planar semi-finished product from a reactive resin as the matrix and cut carbon fibers for reinforcement. A C-sheet molding compound is distinguished by relatively large fiber lengths so that the main body has high mechanical rigidity and strength.

The invention also relates to an assembly of the linking structure having the fiber-reinforced cross-laid structure between the two end sides and a screw for connection to the support.

The fiber-reinforced plastics component may be a strut brace of a motor vehicle and may have two of the linking structures and two fastening screws that pass through the respective linking portions of the linking structures for fastening to two suspension strut receptacles in an engine bay of a motor vehicle. In this embodiment, the suspension strut receptacles form the supports. A strut brace of this type, which is produced from a fiber-reinforced plastics (preferably from a carbon fiber-reinforced plastics), forms an advantageous lightweight construction variant of a conventional strut brace which is known from the prior art and which is produced from a metallic material, in particular from steel.

Further features and advantages of the invention will become evident by means of the description hereunder of a preferred exemplary embodiment with reference to the appended images.

DETAILED DESCRIPTION

Figure 1:
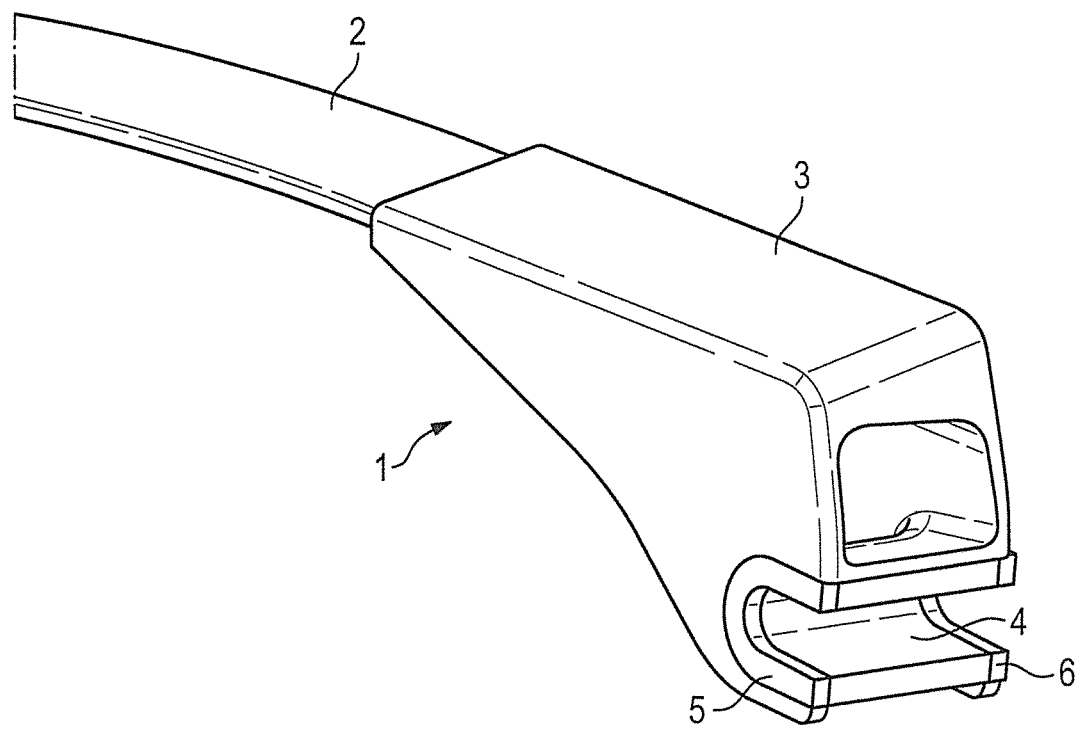
FIG. 1 is a perspective view of a linking structure for linking a fiber-reinforced plastics component to a linking component, wherein the fiber-reinforced plastics component is merely illustrated in part.
Figure 2:
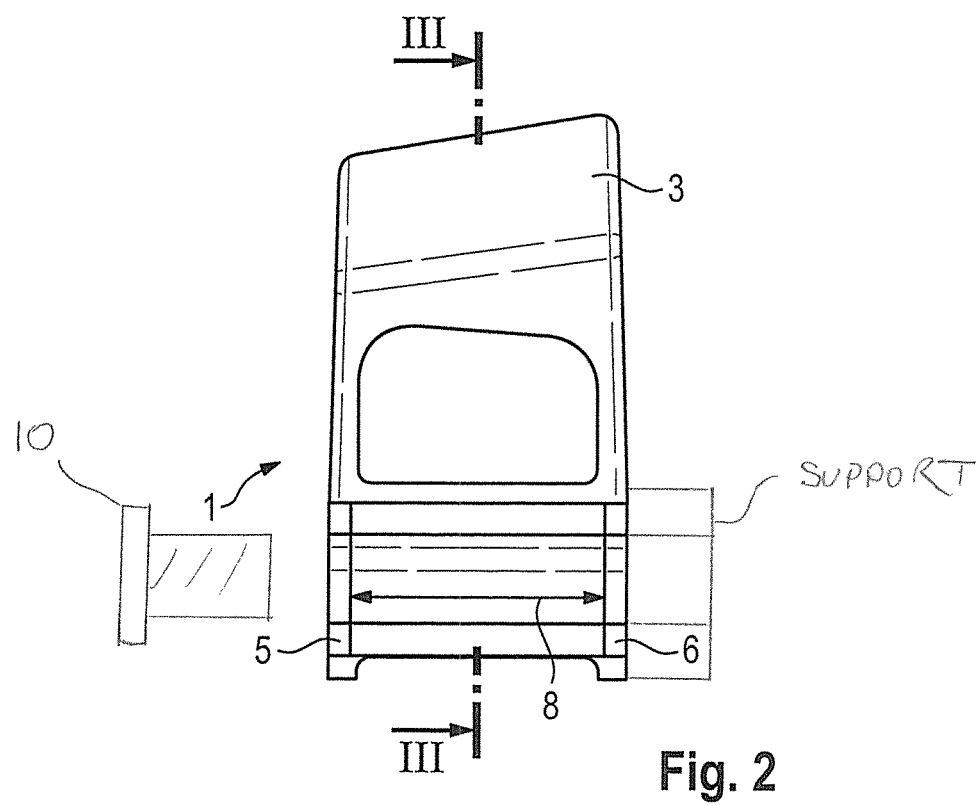
FIG. 2 is a side view of the linking structure of FIG. 1.
Figure 3:
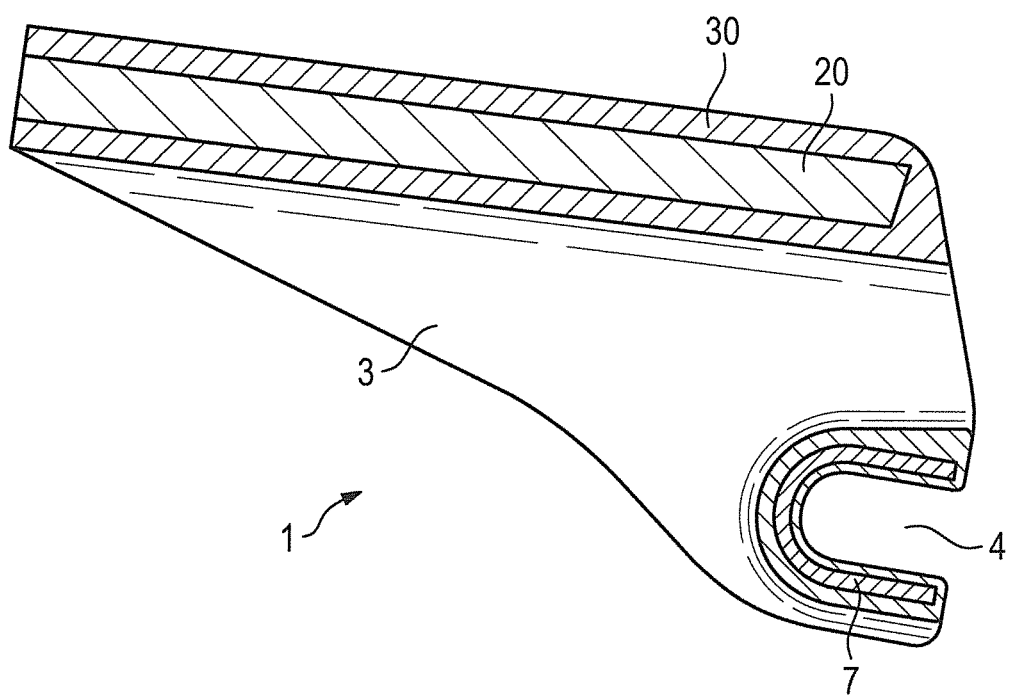
FIG. 3 is a section through the linking structure along a line III-III in FIG. 2.

FIGS. 1 to 3 illustrate a linking structure 1 for linking a fiber-reinforced plastic component 2 to a support S. The linking structure 1 comprises a main body 3 that is produced from a fiber-composite material. The main body 3 preferably is produced from a C-sheet molding compound (abbreviated: C-SMC). The C-sheet molding compound is a planar semi-finished product made from a matrix of a reactive resin and cut carbon fibers that are provided for reinforcement. A C-sheet molding compound advantageously has relatively long fibers so that the main body 3 has a high rigidity and strength. The fiber-reinforced plastic component 2 can be produced from a carbon fiber-reinforced plastics (abbreviated: CFRP). As can be seen in FIG. 3, the main body 3 has a hollow receptacle 30 in which a free end 20 of the fiber-reinforced plastic component 2 is received in a form-fitting manner. The fiber-reinforced plastic component 2 is insert-pressed in the production using the C-sheet molding compound so that a firmly bonded connection of the free end 20 of the fiber-reinforced plastics component 2 and the main body 3 is established in this region.

The main body 3 further comprises a linking portion 4 that has a substantially U-shaped cross section in the exemplary embodiment shown here. The linking portion 4 is shaped and dimensioned so that a fastening screw 10 can be passed through the linking portion 4, thereby enabling the linking structure 1 that is conjointly with the fiber-reinforced plastics component 2 to be screw-fitted to the support S. Metal inserts 5, 6 are provided on the opposite ends of the linking portion 4. Each metal insert 5, 6 has a cross-sectional shape conforming to the cross-sectional shape of the linking portion 4, and thus in this exemplary embodiment is substantially U-shaped. These two metal inserts 5, 6 are employed by virtue of the maximum permissible contact pressure per unit area so that no markings by virtue of the screw fitting are visible at the end sides in the fiber-reinforced plastics component 2.

The external faces of the two metal inserts 5, 6 form two bearing faces by way of which the linking structure 1 bears on the support. It is necessary in this context for the linking portion 4 to have a high compressive strength and compressive rigidity and a minimal setting behavior so that a stable screw fitting can be obtained between the linking structure 1 and the support S. It has been demonstrated that the fiber-composite material C-SMC from which the main body 3 of the linking structure 1 is produced cannot provide the screw connection in the region of the linking portion with a sufficiently high strength and rigidity.

This aforementioned issue regarding strength and rigidity could be addressed by producing the linking portion 4 entirely from metal. However, this approach would disadvantageously run counter to the lightweight construction approach of the linking structure 1 having the fiber-reinforced plastic component 2 connected thereto.

High mechanical strength and rigidity for the screw connection in the region of the linking portion 4 is achieved in accordance with the invention by providing the main body 3 with a unidirectional fiber-reinforced cross-laid structure 7 between the two metal inserts 5, 6 that are on the ends of the linking portion 4. Thus, the compressive strength and the compressive rigidity in the region of the linking portion 4 of the linking structure 1 are increased in an advantageous manner without the overall mass of the linking structure 1 thereby being increased significantly, if at all. The fiber direction 8 is indicated in FIG. 2 by a double arrow that extends in the axial direction of the linking portion 4 and thus along the screw-fitting direction of the fastening screw 10. This fiber direction has a positive effect on the compressive strength and on the compressive rigidity of the screw fitting.

The linking structure 1 described herein can be employed in highly different linking regions of fiber-reinforced plastic components 2. The unidirectional fiber-reinforced cross-laid structure 7 enables the screw-fitting region to withstand higher compressive stresses without the overall mass of the linking structure 1 being increased.

The fiber-reinforced plastic component 2 that in FIG. 1 is illustrated in part, but can be a strut brace of a motor vehicle and be produced from a carbon fiber-reinforced plastics. The strut brace, with the aid of two linking structures 1 of the type described above, is fastened to two opposite suspension strut receptacles that are disposed in an engine bay of a motor vehicle and that form the supports in the sense described above. A strut brace from a carbon fiber-reinforced plastics advantageously has a lower mass than a strut brace produced in the conventional manner from a metal, such as steel.

What is claimed is:

1. A linking structure for linking a fiber-reinforced plastics component to a support, comprising:
a main body produced from a fiber-composite material and having opposite first and second sides, and a linking portion extending through the main body from the first side to the second side, the linking portion being configured such that a fastening screw can be passed through the linking portion, the fastening screw being screw-fittable to the support, the linking portion including:
a fiber-reinforced cross-laid structure having a first end spaced inward from the first side of the main body and a second end spaced inward from the second side of the main body, the cross-laid structure further having a unidirectional fiber-reinforcement with a fiber direction that extends between the first and second ends of the fiber-reinforced cross-laid structure, and
first and second metal inserts disposed on the first and second ends of the fiber-reinforced cross-laid structure, the first and second metal inserts having surfaces facing away from the first and second ends of the fiber-reinforced cross-laid structure that are substantially flush with the first and second opposite sides of the main body.

2. The linking structure of claim 1, wherein the fiber-reinforced cross-laid structure has a cross-sectional shape that corresponds to a cross-sectional shape of the linking portion.

3. The linking structure of claim 2, wherein each of the metal inserts has a cross-sectional shape corresponding to a cross-sectional shape of the linking portion.

4. The linking structure of claim 1, wherein the main body is produced from a C-sheet molding compound.

5. An assembly for connecting a fiber-reinforced plastics component to a support, comprising:
a linking structure fastened to the fiber-reinforced plastics component, the linking structure having a main body produced from a fiber-composite material and having opposite first and second sides, the linking structure further having a linking portion with a passage extending therethrough from the first side to the second side of the main body, the linking structure including:
a fiber-reinforced cross-laid structure having a first end spaced inward from the first side of the main body and a second end spaced inward from the second side of the main body, the cross-laid structure further having a unidirectional fiber-reinforcement with a fiber direction that extends between the first and second ends of the fiber-reinforced cross-laid structure, and first and second metal inserts disposed on the first and second ends of the fiber-reinforced cross-laid structure, the first and second metal inserts having surfaces facing away from the first and second ends of the fiber-reinforced cross-laid structure that are substantially flush with the first and second opposite sides of the main body; and a fastening screw passing through the linking portion and being screw-fittable to the support.

6. The assembly of claim 5, wherein the fiber-reinforced plastics component is a strut brace of a motor vehicle that has two opposite ends, each of the ends having one of the linking structures and one of the fastening screws, the fastening screws fastening the linking structures to two suspension strut receptacles in an engine bay of a motor vehicle.

* * * * *